June 24, 1958  G. B. STILLWAGON, JR  2,839,903
PINNING FOR HEAVY DUTY UNIVERSAL JOINT
AND METHOD OF MAKING SAME
Filed May 5, 1955

INVENTOR.
GEORGE B. STILLWAGON JR.
BY
HIS ATTORNEYS

2,839,903

PINNING FOR HEAVY DUTY UNIVERSAL JOINT AND METHOD OF MAKING SAME

George B. Stillwagon, Jr., Dayton, Ohio, assignor of one-half to Kenneth G. Fraser, Dayton, Ohio Application May 5, 1955, Serial No. 506,237

6 Claims. (Cl. 64—17)

This invention relates to pinning for heavy duty universal joints, and more particularly to a type of pinning which, after assembling and processing, is permanent.

An object of this invention is the provision of a pin construction in heavy duty universal joints which is simple and easy to construct, and yet one which provides an efficient, sturdy, permanent construction which will not jar apart under long continued and heavy use.

A further object of the invention is the provision of a method of making a permanent pinning construction by upsetting the ends of the pins, thereby producing a permanent construction.

A further object of the invention is the provision of a device wherein a balance of strength is provided between a split pin and a solid pin in such a way that no stress areas are produced.

Other objects and advantages reside in the construction of parts, the combination thereof and the mode of operation, as will become more apparent from the following description.

It is to be understood that the pinning device can be used in any position, but for the purpose of orienting the views of the drawing with respect to each other, one side of the device will be referred to as "the top" and the remaining portions described accordingly.

Figure 1:
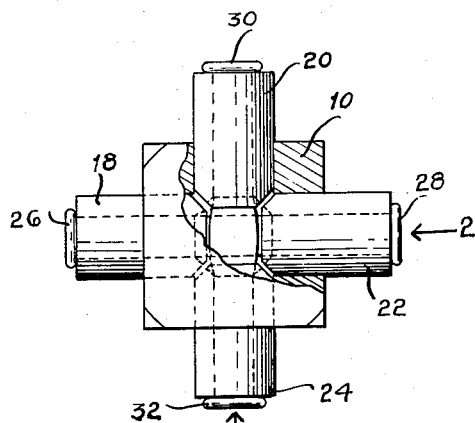
Figure 1 is a top plan view of the completed pinning, with portions shown in section, and showing internal portions in dotted lines.
Figure 2:
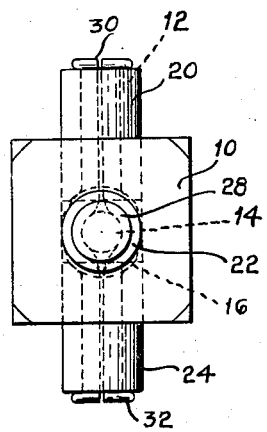
Figure 2 is an end elevational view taken from the position of the arrow 2 in Figure 1, and showing internal portions in dotted lines.
Figure 3:
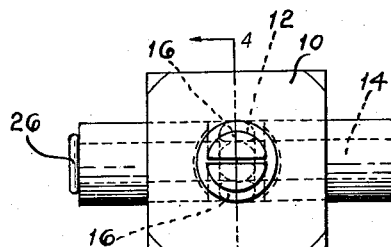
Figure 3 is an end elevational view of the completed pinning device, taken from the position of the arrow 3 in Figure 1, and showing internal portions in dotted lines.
Figure 4:
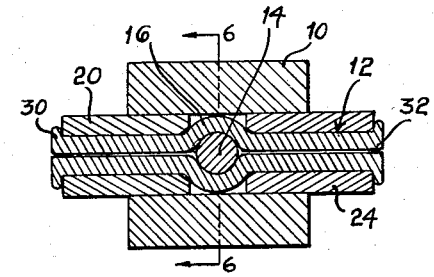
Figure 4 is a cross section taken substantially on the line 4—4 of Figure 3.

Referring more in detail to the drawing, a block 10 is provided with a pair of right angularly disposed borings, meeting and forming a space at the center. A split pin 12 and a solid or unitary pin 14 extend at right angles through these borings. The split pin 12 consists of two halves, provided at their midportions with complementary semi-circular portions 16 forming a circular opening, when nested together, for accommodating the solid pin 14.

Four bushings 18, 20, 22 and 24, each provided with beveled inner ends, are inserted around the ends of the pins 12 and 14, holding them centered, and providing the arms for a central block of the universal joint. In the completed pinning device, the pins 12 and 14 are provided with upset heads 26, 28, 30 and 32 which hold the pins in place.

Figure 5:
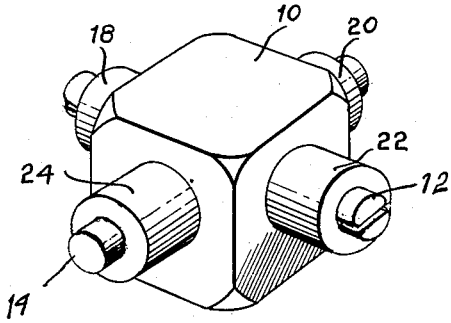
Figure 5 is a perspective view of the pinning construction with the parts assembled, and prior to applying the electrodes to the ends of the pins.
Figure 6:
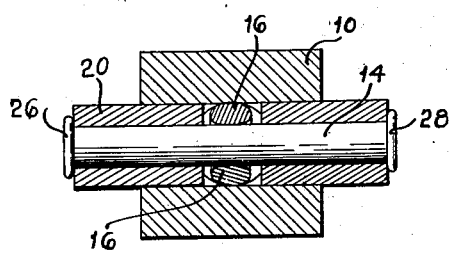
Figure 6 is a cross sectional view of the pinning construction taken substantially on the line 6—6 of Figure 4, showing the solid pin in its entirety.

The device is assembled and processed as follows: The split pin 12 is inserted into one of the borings in the block 10. The solid pin 14 is then inserted into the other boring and is nested in the circular portion 16 formed by separating the two halves of the split pin 12. The bushings 18, 20, 22 and 24 are next inserted. The device at this stage has the form shown in Figure 5. The ends of each pin are then upset to form heads 26, 28, 30 and 32, and the device is securely and permanently held together. The heads may be upset by either hot or cold process.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. Pinning construction for universal joints comprising a block having right angular borings, a split pin and a solid pin, said split pin comprised of halves provided with complementary semi-circular curved portions midway of their ends, said pins being positioned in said right angular borings, the solid pin being nested between the curved portions of said split pin, and upset heads on the ends of the pins retaining the pins within the block.

2. Pinning construction for universal joints comprising a block having right angular borings, a split pin having halves, a solid pin, the halves of said split pin being provided with curved portions midway of their ends, said pins being positioned in said right angular borings, the solid pin being nested between the semi-circular portions of said split pin, a bushing inserted in each end of each boring surrounding said pins and protruding beyond the confines of said block, upset heads on the ends of said pins for uniting the halves of said split pin and securing them within said bushings, and for securing said bushings in said block.

3. Pinning for a universal joint comprising a block, right angularly disposed borings in said block, bushing members positioned in said borings and protruding from said block to form arms, a solid pin extending through a pair of said bushings, a split pin extending through a second pair of said bushings, said second pair of bushings being disposed right angularly to said first mentioned pair of bushings, said split pin being provided with a centrally positioned opening, said solid pin extending through said opening, and upset ends on both ends of each of said pins for securing said bushings permanently in position in said block.

4. Pinning construction for universal joints including a block having intersecting borings, a longitudinally split pin having halves, a unitary pin, said pins being positioned in said borings, the unitary pin being nested between the halves of the split pin, and means for retaining the pins within the block.

5. Pinning construction for universal joints comprising a block having intersecting borings, a split pin having halves, a unitary pin, said pins being positioned in said borings, the unitary pin being nested between the halves of the split pin, a bushing inserted in each end of each boring surrounding the pin positioned in the boring and protruding beyond the confines of said block, and means for retaining said pins in said bushings to secure said bushings in said block.

6. Pinning construction for universal joints comprising a block having intersecting borings, a split pin having halves, a unitary pin, the halves of said split pin being provided with curved portions midway of their ends, said pins being positioned in said borings, the unitary pin being nested between the semi-circular portions of said split pin, a bushing inserted in each end of each boring surrounding said pins and protruding beyond the confines of said block, upset heads on the ends of said pins for securing them within said bushings and for securing said bushings in said block.

References Cited in the file of this patent

UNITED STATES PATENTS

| | | |
|---|---|---|
| 1,267,852 | Curtis | May 28, 1918 |
| 1,700,991 | Wintercorn | Feb. 5, 1929 |
| 2,226,819 | Jeffries | Dec. 31, 1940 |
| 2,369,810 | Stillwagon | Feb. 20, 1945 |